United States Patent [19]
Cheffey

[11] Patent Number: 5,480,171
[45] Date of Patent: Jan. 2, 1996

[54] SLIDER LOCKING MECHANISM

[75] Inventor: Dean C. Cheffey, Springfield, Mo.

[73] Assignee: Hutchens Industries, Inc., Springfield, Mo.

[21] Appl. No.: 339,155

[22] Filed: Nov. 10, 1994

[51] Int. Cl.⁶ .................................................. B62D 53/06
[52] U.S. Cl. ................................ 280/149.2; 180/24.02; 180/906; 280/405.1
[58] Field of Search .......................... 280/149.2, 407.1, 280/405.1, 423.1; 180/906, 24.01, 24.02

[56] References Cited

U.S. PATENT DOCUMENTS

| | | |
|---|---|---|
| 2,935,332 | 5/1960 | Delay . |
| 2,978,051 | 4/1961 | Risk et al. . |
| 3,146,000 | 8/1964 | Holzman . |
| 3,365,211 | 1/1968 | Ginsburg . |
| 3,372,946 | 3/1968 | Hutchens . |
| 3,778,079 | 12/1973 | Vornberger et al. . |
| 4,286,797 | 9/1981 | Mekosh, Jr. . |
| 4,353,565 | 10/1982 | Smith et al. . |
| 4,838,578 | 6/1989 | Baxter . |
| 5,137,296 | 8/1992 | Forman . |
| 5,199,732 | 4/1993 | Lands et al. . |
| 5,314,201 | 5/1994 | Wessels . |

*Primary Examiner*—Eric D. Culbreth
*Attorney, Agent, or Firm*—Cushman Darby & Cushman

[57] ABSTRACT

A locking system for locking a tandem wheel assembly of a wheeled vehicle with respect to longitudinally extending members of a trailer body. The locking system includes a plurality of pins mounted for movement between extended and retracted positions. The pins engage within selected openings in the extending members. A spring is operatively associated with each pin for resiliently biasing the pin into the retracted position thereof when in an unstuck condition. The locking system also includes a linkage mechanism constructed and arranged (1) to move the pins from their retracted positions into their extended positions within a selected opening against the resilient bias thereof in response to the movement of the linkage mechanism and (2) to allow movement of the pins from their extended positions into their retracted positions to occur by virtue of the resilient bias thereon (A) when in an unstuck condition and (B) when in a stuck condition at a time after the movement of said linkage mechanism from an operative position to an adjusting position when the stuck condition has been changed to an unstuck condition.

13 Claims, 6 Drawing Sheets

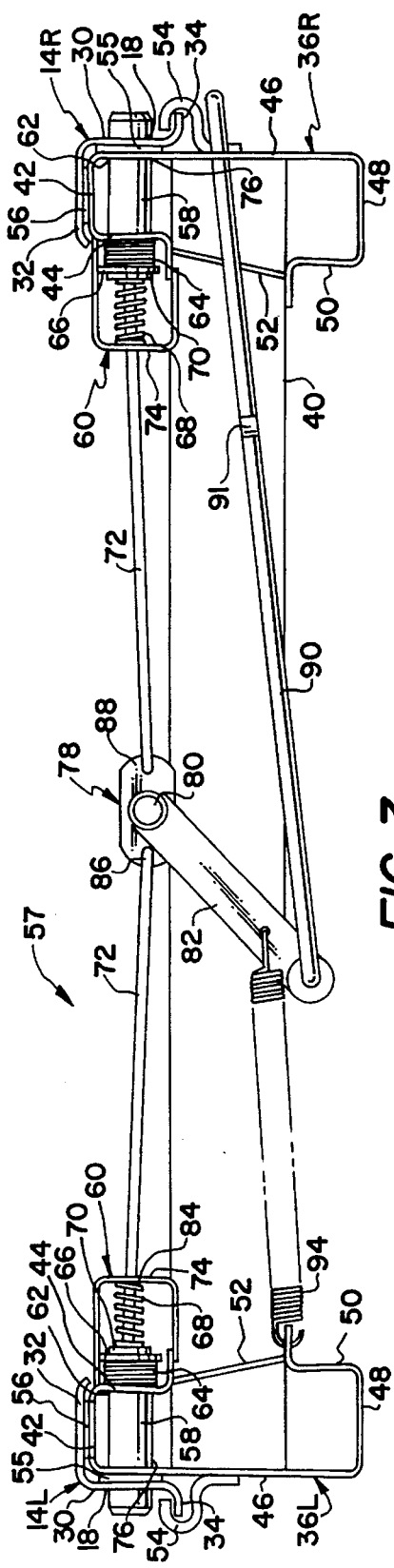
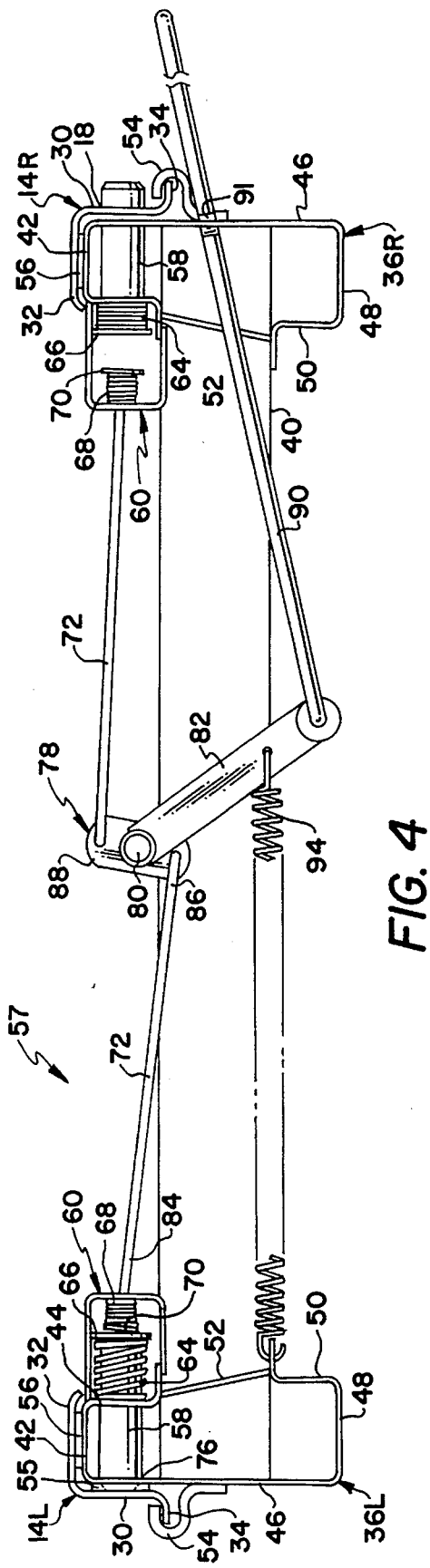

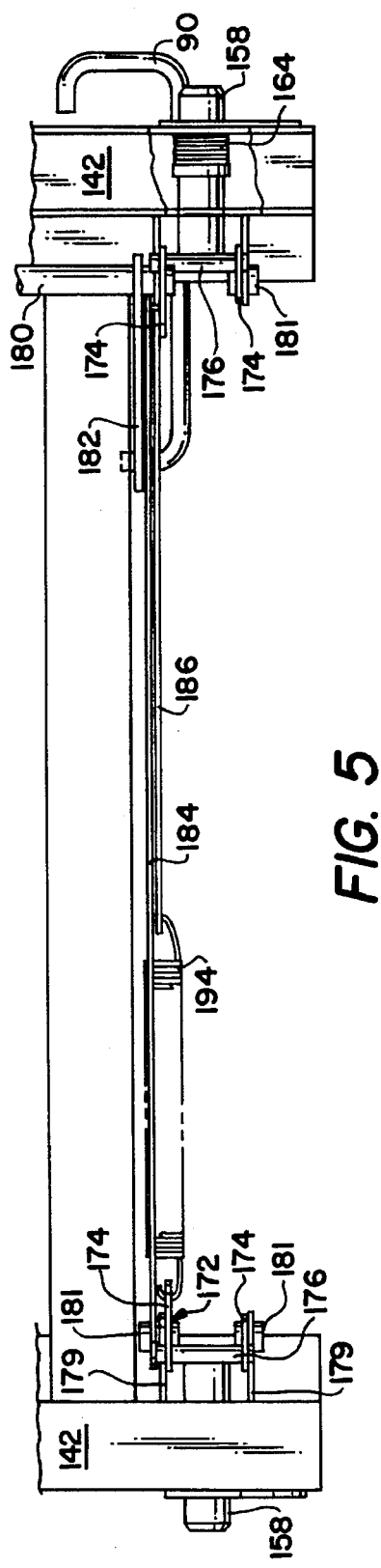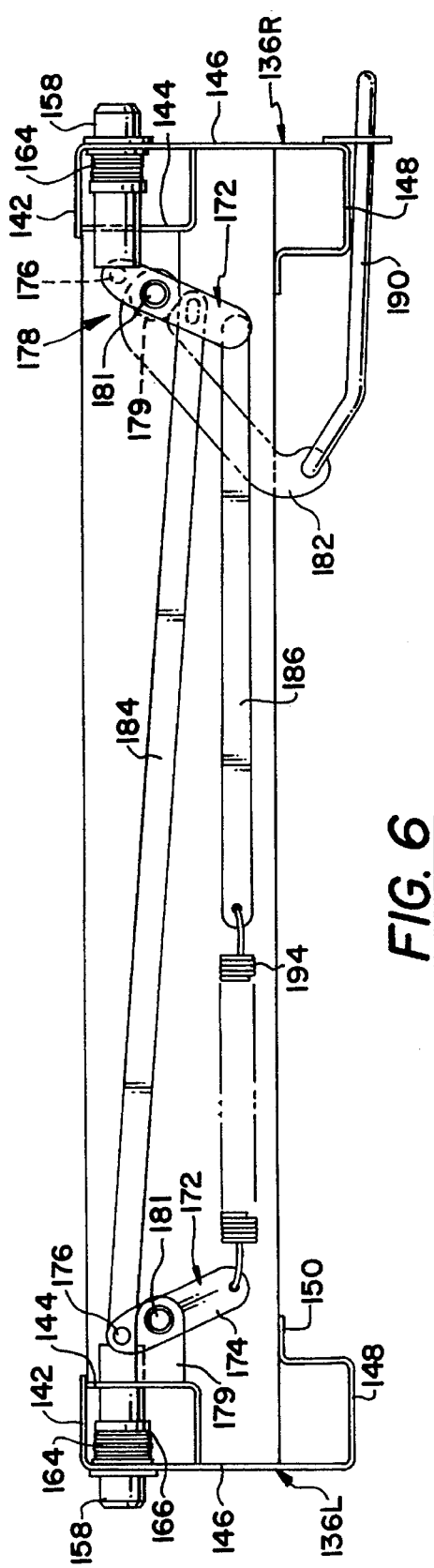
FIG. 5
FIG. 6

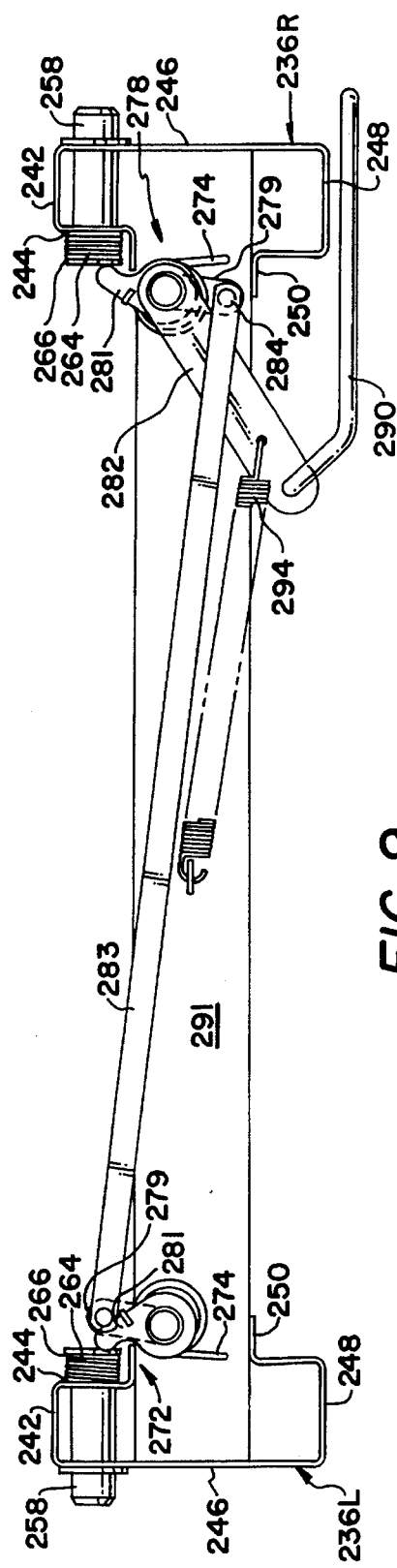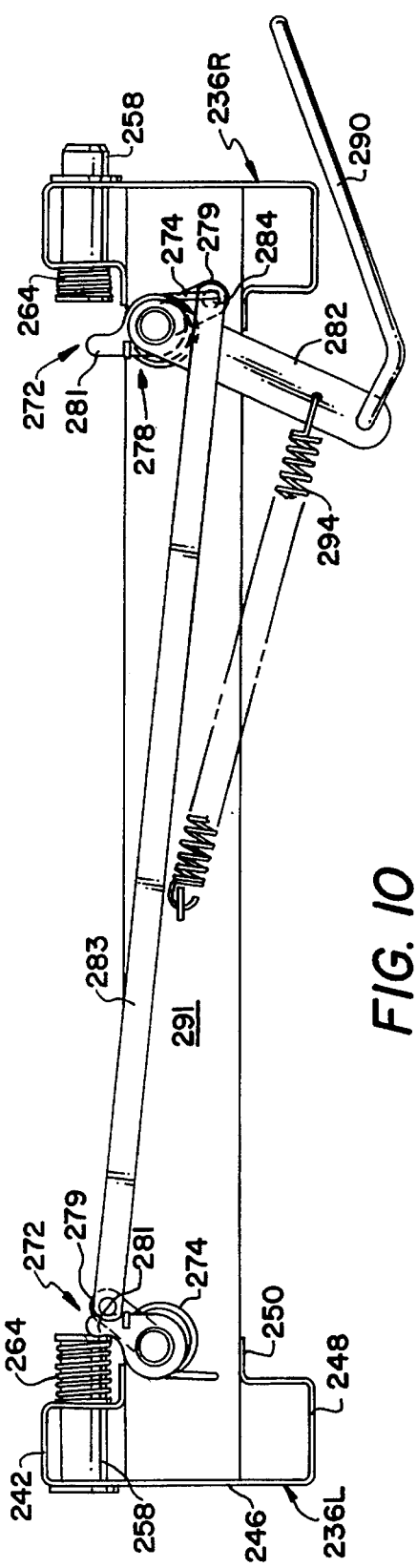

SLIDER LOCKING MECHANISM

BACKGROUND OF THE INVENTION

This invention relates to sliders for adjustment of the suspension of a wheeled vehicle longitudinally with respect to a trailer body of the vehicle, and more particularly, to a system for facilitating such adjustment.

Frequently, tandem axle trailers and like vehicles cannot always be loaded equally throughout their length with the result that the loads bearing on the wheels supporting the vehicle are not always uniform. Many prior devices have been devised to compensate for this unbalanced load condition. Typically, the device for compensating an unbalanced load must be adjustable while the vehicle is loaded, for it is only at this time that the operator of the vehicle can determine the correct position for equally distributing the load. Since the variation of position must be accomplished when the vehicle is loaded, the means connecting the sub-frame to the vehicle must be adapted to allow such adjustment in a relatively easy manner while under the influence of a substantial load. Conventional slider devices used for this purpose typically comprise a pair of side rails secured at the left and right sides of the vehicle trailer in a fixed position extending longitudinally of the trailer, and a sub-frame which carries the suspension comprising left and right slide members slidable of the trailer on the side rails. Typically, a plurality of locking pins lock the sub-frame in various positions of adjustment relative to the side rails. The locking pins are retractable, permitting adjustment of the sub-frame to selected positions of adjustment and may be extendable for locking the sub-frame in a select position of adjustment. A linkage is provided for moving the locking pins from the extended position to a retracted position and from the retracted position to the extended position. Typically, the linkage is operable to retract the pins by moving a pull rod which extends laterally outwardly from the side of the sub-frame.

The pull rod and linkage design described above has been used for many years, but has a serious drawback. The locking pins often become stuck in the extended position due to the pins being wedged in openings in the slider sub-frame, thus making it difficult if not impossible to operate the pull rod to retract the pins to facilitate the adjustment. When one or more pins become stuck, the operator of the vehicle must jostle the trailer by driving the vehicle forwardly or rearwardly in short increments until the pins are sufficiently free to enable the pull rod to be operated. Such a procedure is inconvenient and time consuming particularly if there is only one person operating the vehicle, since while jostling the trailer to free the pins, there is no indication to the vehicle driver when the pins are freed. Thus, upon jostling the trailer, the operator must move from the cab of the vehicle to the location of the pull rod to determine whether the pins are freed and if the pins are not freed, must return to the cab and repeat the jostling procedure. Such procedure is not as troublesome when there is a second person available, since the second person may pull on the pull rod while the trailer is being jostled to free the pins and then so indicate to the person jostling the vehicle. However, a second person is not always available.

A slider system has been disclosed which attempts to solve this problem. U.S. Pat. No. 4,838,578 discloses a slider having a mechanism for retracting locking pins biased by associated pin springs. The mechanism comprises a linkage interconnecting the locking pins for conjoint movement of the pins between extended and retracted positions. A manually movable handle actuates the linkage. A handle spring is associated with the handle and is configured to be strong enough to overcome the force of the pin springs. The handle spring will deflect when one or more pins are in a stuck condition which permits the handle to move outwardly while maintaining a force urging rotation of a crank of the linkage to effect articulation of the pins. The handle can be locked in its outward position and the vehicle can be jostled to free the pins. Once the pins are freed, the force of the deflected handle spring causes the crank to rotate to retract the pins. However, when one or more pins are stuck, a significant manual effort is required by the operator to move the handle to a position whereby the handle spring deflects so as to assist in moving a stuck pin to an unstuck condition.

Accordingly, a need exists to provide a slider locking system for retracting and extending locking pins of a slider sub-frame to permit adjustment of a suspension of a vehicle longitudinally of the body of the vehicle which may be operated with minimal effort by one person, even in the event the locking pins become stuck during retraction thereof.

SUMMARY OF THE INVENTION

It is an object of the invention to fulfill the need described above. In accordance with the principles of the present invention, this object is achieved by providing a wheeled vehicle comprising a trailer body including a pair of longitudinally extending members having a series of longitudinally spaced openings formed therein, a tandem wheel assembly including a frame supporting a portion of the trailer body for relative longitudinal sliding motion with respect thereto to vary the longitudinal position of support and a pin locking system carried by the tandem wheel assembly cooperable with the openings to selectively lock the trailer body and tandem wheel assembly in a selected longitudinal position of support. The locking system includes a plurality of pins mounted on the frame for movement between extended and retracted positions. The pins are constructed and arranged to engage within selected openings of the series of openings when in the extended position thereof to thereby retain the tandem wheel assembly in a selected position of longitudinal adjustment with respect to the trailer body. A spring is operatively associated with each pin for resiliently biasing the pin into the retracted position thereof when in an unstuck condition. The locking system also includes a linkage mechanism carried by the frame constructed and arranged to be moved between an operative position and an adjusting position. The linkage mechanism is constructed and arranged with respect to the pins (1) to move the pins from the retracted position thereof into the extended position thereof within a selected opening against the resilient bias thereof in response to the movement of the linkage mechanism from the adjusting position thereof to the operative position thereof and (2) to allow movement of the pins from the extended position thereof into the retracted position thereof to occur by virtue of the resilient bias thereon (A) when in an unstuck condition during the movement of the linkage mechanism from the operative position thereof and (B) when in a stuck condition at a time after the movement of said linkage mechanism from the operative position thereof to the adjusting position thereof when the stuck condition has been changed to an unstuck condition.

Another object of the present invention is the provision of a slider locking system of the type described which is simple in construction, effective in operation and economical to manufacture and maintain.

These and other objects of the present invention will become more apparent during the course of the following detailed description and appended claims.

The invention may be best understood with reference to the accompanying drawings wherein an illustrative embodiment is shown.

BRIEF DESCRIPTION OF THE DRAWINGS

FIG. 3 is a side elevational view of the locking system of FIG. 2, shown in a first position wherein the locking pins are in an extended position locking the sub-frame in fixed relation to the trailer body;

FIG. 4 is a view similar to FIG. 3, showing the locking system in a second position wherein one of the locking pins is retracted while a second locking pin is stuck in an extended position;

FIG. 5 is a partial plan view of a locking system of another embodiment of the invention;

FIG. 6 is a side elevational view of the locking system of FIG. 5, shown in a first position wherein locking pins are in an extended position;

FIG. 9 is a side elevational view of the locking system of FIG. 8, shown in a first position wherein locking pins are in an extended position; and FIG. 10 is a view similar to FIG. 9, showing the locking system of FIG. 8 in a second position wherein one of the locking pins is retracted while a second locking pin is stuck in an extended position.

DETAILED DESCRIPTION OF THE PRESENTLY PREFERRED EXEMPLARY EMBODIMENT

Figure 1:
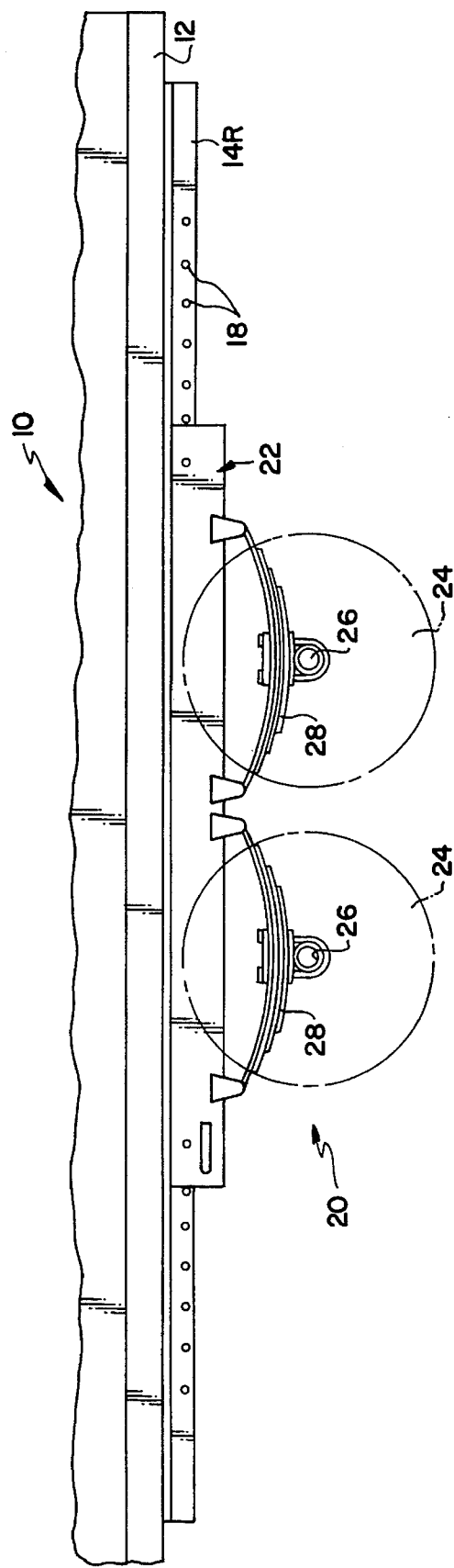
FIG. 1 is a side elevational view of a portion of a trailer body of a wheeled vehicle and a slider sub-frame supporting a portion of the trailer body incorporating a locking system, provided in accordance with the principles of the present invention.

Referring now to more particularly the drawings, there is shown therein a side elevational view of a portion of a wheeled vehicle 10 including a trailer body 12 including a pair of longitudinally extending members 14R, 14L fixed to the bottom of the trailer body 12 at the left and right sides thereof. The extending members 14R, 14L include a series of longitudinally spaced openings 18 formed therein, the function of which will become apparent below.

The trailer body 12 is supported by a tandem wheel assembly 20 including a slider sub-frame 22 which supports a portion of the trailer body for relative longitudinal sliding motion with respect to the trailer body 12 to vary the longitudinal position of support. The sub-frame 22 includes tandem wheels 24 rotatably mounted on axles 26 which are suspended by springs 28.

Figure 2:
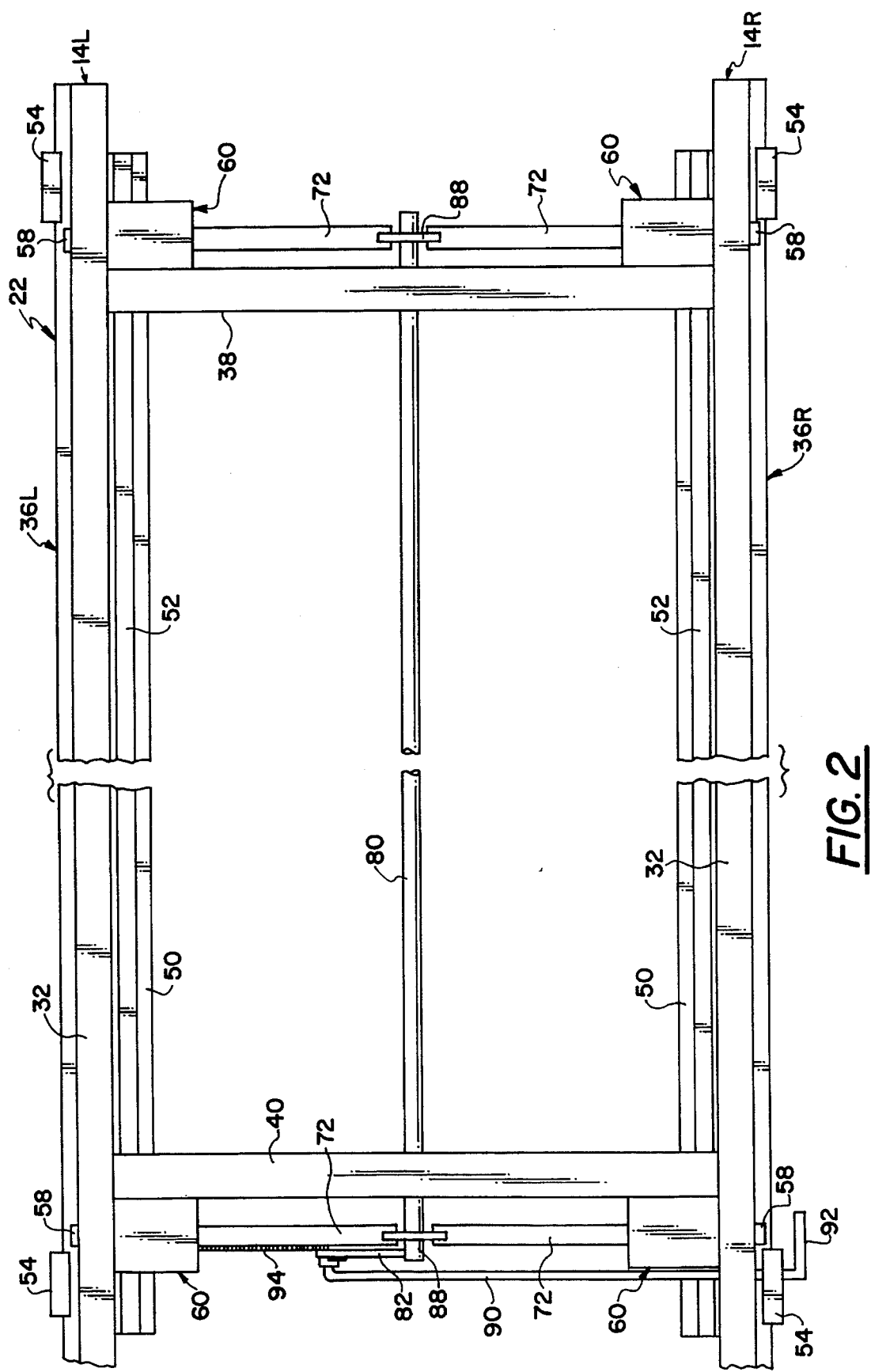
FIG. 2 is a plan view of a locking system carried by the sub-frame for retracting and extending locking pins to permit adjustment of the suspension of the vehicle longitudinally of the vehicle.

As best shown in FIG. 3, each extending member 14R, 14L is generally Z-shaped in cross-section and has a generally vertical portion 30, an upper inwardly directed horizontal flange portion 32 and a lower outwardly directed horizontal flange 34. As shown in FIG. 2, the sub-frame 22 is of generally rectangular configuration and carries the suspension and includes left and right slide members 36L and 36R, respectively, and front and rear cross-beams 38, 40 interconnecting the slide members. The slide members 36L, 36R are slidable longitudinally of the trailer body 12 on the extending members 14L, 14R. In the illustrated embodiment shown in FIG. 3, each slide member 36L, 36R has an upper inwardly directed horizontal flange 42 spaced below the upper horizontal flange portion 32 of the extending member, a lip 44 bent downwardly from the inner end of the upper horizontal flange 42, a generally vertical side wall 46 disposed inwardly of vertical portion 30 of the extending member, a lower inwardly directed flange 48, and a lip 50 bent upwardly from the inner end of the lower flange 48. A reinforcing member 52 spans lip 44 and lip 50. A plurality of hooked-shaped members 54 are affixed to the side walls 46 of the slide members 36L, 36R so as to overlie the lower horizontal flanges 34 of respective extending members 14L, 14R to permit the sub-frame 22, carrying the suspension, to be slidably adjustable relative to the extending members 14L, 14R. In the illustrated embodiment, a pad 56 is disposed between the horizontal flange portion 32 of the extending member and the horizontal flange 42 of the slide member to ensure a low friction, close-sliding fit between the two members. A bushing 55 is affixed between the vertical flange 30 and side wall 46.

A pin locking system, carried by the tandem wheel assembly 20 and generally indicated at 57, includes a plurality of locking pins 58 provided for locking the sub-frame 22 to the extending members 14L, 14R in various positions of adjustment relative thereto. In the illustrated embodiment, four locking pins are provided and, as shown in FIG. 2, two pins 58 are disposed at the front of the subframe 22 and two pins 58 are disposed at the rear of the sub-frame 22 opposite the extending members 14L, 14R.

A housing assembly, generally indicated at 60 is associated with each pin 58 and has a generally C-shaped transverse cross-section. Each housing assembly 60 is coupled to the downwardly extending lip 44 of the slide member. The downwardly extending lip 44 includes a bore 62 for receiving the locking pin 58 in a slidable manner. The locking pins 58 are mounted for linear horizontal movement in a direction transverse to the trailer body 12 and are retractable so as to permit adjustment of the sub-frame 22 to various positions of adjustment relative to the extending members 14L, 14R. The locking pins 58 may be extended for locking the sub-frame 22 and thus the tandem wheel assembly 20 in a selected position of adjustment to compensate for a particular loading of the trailer body 12. As shown in FIG. 3, the locking system 57 includes a pin spring 64 associated with each locking pin 58, disposed between a pin flange 66 and the downwardly extending lip 44 of the slide member so as to normally bias the locking pin 58 into a retracted position as shown in the left hand portion of FIG. 4. A linkage spring 68 is provided within the housing assembly 60 between flange 70 of a linkage 72 and the vertical flange 74 of the housing assembly 60.

As shown in FIG. 3, when a locking pin 58 is in its extended position it extends through opening 62 in the downwardly extending lip 44, opening 76 in the side wall 46 of the slide member, through bushing 55 and then through one of the series of longitudinally spaced openings 18 in the associated extending member. Each locking pin 58 is biased towards its extended position by its associated link spring 68, which will be discussed more fully below.

The locking system 57 includes a linkage mechanism, generally indicated at 78, carried by the sub-frame 22 of the tandem wheel assembly 20. The linkage mechanism 78 is constructed and arranged to be moved between an operative position and an adjusting position. The linkage mechanism 78 comprises a shaft 80 extending longitudinally of the sub-frame 22 and generally parallel to the extending members 14L, 14R and midway therebetween. The shaft 80 is journalled in the cross-beams 38 and 40 for rotation by means of a crank arm 82 at the rearward end of the shaft 80. As noted above, a linkage 72 is associated with each locking pin 58. One end 84 of each linkage 72 is slidably disposed within the housing assembly 60 with a linkage spring 68 associated therewith. The other end 86 of each linkage 72 is rotatably coupled to a cam 88. As shown in FIG. 2, the cam 88 is rotatably coupled to the shaft 80 at both the front and rear of the subframe 22. An actuating member 90 is rotatably coupled to the crank arm 82 at an end opposite the crank arm and shaft connection for moving the linkage mechanism 78 from its operative position to its adjusting position. The actuating member 90 is in the form of pull rod and extends generally transversely with respect to the trailer body 12 outwardly through openings in the side wall 46 of the right slide member 36R at the rear of the sub-frame. The proximal end of the actuating member 90 is bent to form a handle 92 which may be grasped and manually pulled outwardly in the direction of the length of the actuating member 90 from a position shown in FIG. 3 to a position shown in FIG. 4, as explained below. A handle return spring 94 is disposed between a lower portion of the crank arm 82 and the upwardly shaped lip 50 of the slide member 36L.

The arrangement of the linkage mechanism 78 is such that rotation of the crank arm 82 via manual movement of the actuating member 90 in one direction permits retraction of the locking pins 58 to a position shown in the left hand portion of FIG. 4 and rotation of the crank arm 82 in the opposite direction permits extension of the locking pins 58 into a position shown in FIG. 3. Thus, when the linkage mechanism 78 is in an operative position, shown in FIG. 3, with the actuating member 90 in an operative position and conventionally locked with respect to the sub-frame 22, each linkage spring 68 is in an expanded condition so as to engage and move the pins 58 to their extended position (FIG. 3). The combined force of the handle return spring 94 and/or the linkage springs 68 is greater than the resilient bias of the pin springs 64 so that the locking pins 58 are forced to their extending position in engagement with the selected spaced openings 18 in the extending members 14R, 14L. When the pins 58 are extended, the pin springs 64 are compressed and the linkages springs 68 are in an expanded condition. As a result, the sub-frame 22 and thus the tandem wheel assembly 20 is retained in a selected position of longitudinal adjustment with respect to the trailer body 12.

When it is desired to move the tandem wheel assembly 20 with respect to the trailer body 12 so as to accommodate a different load of the vehicle, the handle 92 is manually grasped and the actuating member 90 is pulled outwardly against the bias of spring 94 to an adjusting position, as shown in FIG. 4, which in turn rotates the crank arm 82 in a counter-clockwise direction so that the linkages 72 are moved inwardly, thereby compressing the linkage springs 68 so as to be disposed in an adjusting position. At this time, if there is no binding of the locking pins 58, the pin springs 64 resiliently bias the unstuck locking pins 58 to their retracted position as shown in the left hand portion of FIG. 4. However, if one or more locking pin 58 is in a stuck condition, as shown in the right hand portion of FIG. 4, the bias of the pin spring 64 alone will not facilitate unlocking the stuck locking pin 58. For this reason, the actuating member 90 includes a notch 91 which may engage side wall 46 of slide member 36R in any conventional manner to lock the actuating member 90 in its adjusting position. With the actuating member 90 locked in its adjusting position, the vehicle operator may return to the vehicle cab and perform a jostling movement of the vehicle so that relative movement of the sub-frame 22 with respect to the extending members causes the stuck locking pin 58 to be freed from its stuck position. Once the pin 58 is freed from its stuck position, the bias of its associated pin spring 64 moves the now unstuck pin 58 to its retracted position. Once all locking pins 58 are freed, the vehicle may be moved forwardly or rearwardly to align with desired openings 18 in the extending members 14R, 14L to distribute the load within the trailer body 12 uniformly. Thereafter, the actuating member 90 may be moved inwardly to move the linkage mechanism 78 to its operative position thereby moving the pins 58 to their extended position to lock the trailer body 12 in a selected longitudinal position of support.

Thus, it can be appreciated that each locking pin 58 is independently movable with respect to the linkage mechanism 78 during retraction of the pins 58. A linkage spring 68 abuts an associated locking pin 58 to effect conjoint movement of the locking pins 58 in a direction tending to extend the locking pins 58, while providing independent movement thereof in the opposite direction. During this movement, any one of the four locking pins 58 which is not stuck will be moved by its associated pin spring 64 from its extended position to its retracted position. If any one of the four locking pins 58 is stuck there will be no movement of that pin's associated pin spring 64. However, after the operator of the vehicle moves the tractor back and forth to relieve the binding pressure on the stuck pin, the associated pin spring 64 will retract the now unstuck pin.

With the locking system of the present invention, even if all of the pins 58 are stuck, the operator need only apply a force sufficient to overcome the force of the linkage springs 68 and/or handle return spring 94 in moving the actuating member 90 to its adjusting position. Moreover, if only one of the pins 58 is stuck, the other three pin springs 64 will assist in the movement of the actuating member 90 so as to reduce the manual effort required to move the actuating member.

It can be appreciated that various modifications can be made to the pin locking system of the invention. It is within the contemplation of the invention to modify the structure of FIG. 3 and 4 by placing spring 64 about pin 58 between lip 44 and sidewall 46, for example in the manner shown in FIG. 6. Further, in lieu of providing linkage springs 68 and rods 72, a pair of linkages (not shown) may be coupled to cam 88 at one end thereof, and an actuator (not shown) may be coupled to the other end of the linkages, adjacent an associated locking pin 58. Each actuator can be constructed and arranged to be pivotally coupled to lip 50 such that a distal end thereof may cooperate with an associated locking pin 58. With this arrangement, rotation of crank arm 82 permits retraction of the locking pin 58 since the actuator may pivot inwardly, and rotation of crank arm 82 in the opposite direction permits the actuator to pivot outwardly to contact and extend the pins 58 against the bias of spring 64 into their operative position, locked with the sub-frame. Each actuator is also resiliently coupled to the sidewall 46 by an associated spring.

A further modification of the locking system of FIGS. 3 and 4 may include providing a leaf spring (not shown) associated with each locking pin 58 in lieu of pin springs 64. Each leaf spring may be fixed at one end thereof to sidewall 46, with the free end of each leaf spring being operatively associated with a locking pin 58. As in the illustrated embodiment, with this structure, the combined force of the handle return spring 94 and linkage springs 68 is greater than the bias of the leaf springs so that the locking pins 58 are forced to their extended positions. Rotation of the crank arm 82 compresses the linkage springs 68. As in the illustrated embodiment, in this position if there is no binding of the locking pins 58, the leaf springs bias the unstuck locking pins 58 to their retracted position.

Figure 7:
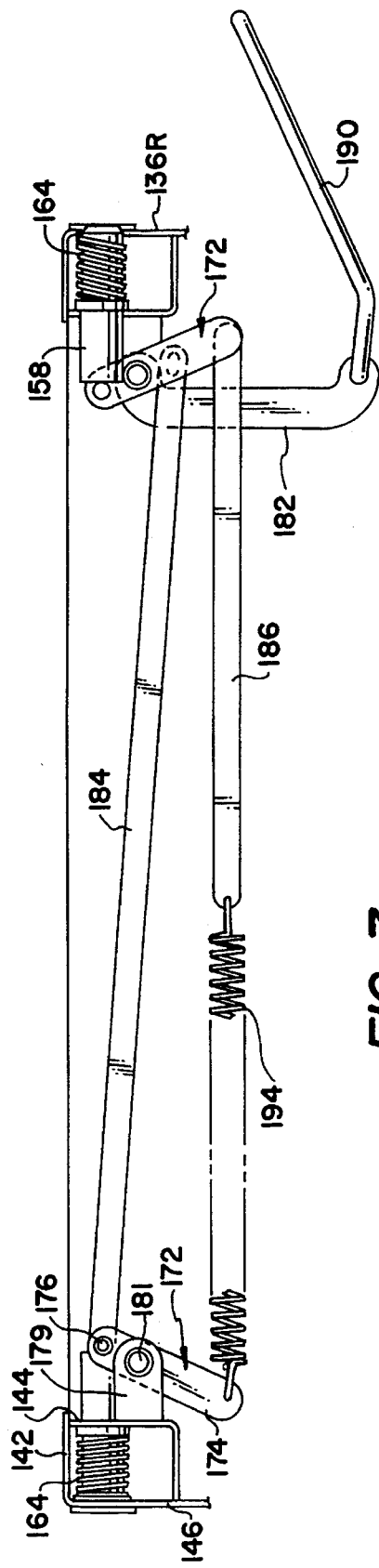
FIG. 7 is a view similar to FIG. 6, showing the locking system of FIG. 5 in a second, retracted position.

Referring now more particularly to FIGS. 5–7, a second embodiment of the present invention is shown. FIG. 5 is a partial plan view of a locking system carried by the sub-frame of a vehicle. The locking system, generally indicated at 157, is similar in function to that of the embodiment of FIGS. 1–4. The extending members 14L, 14R are not shown in FIGS. 5–7 for clarity of illustration. As in the previous embodiment, the slide members 136L, 136R are slidable longitudinally of the trailer body on the extending members.

In the illustrated embodiment of FIGS. 5–7, each slide member 136L, 136R has an upwardly inwardly directed horizontal flange 142, a lip 144 bent downwardly from the inner end of the upper horizontal flange 142, a generally vertical side wall 146, an inwardly directed flange 148 and a lip 150 bent upwardly from the inner end of lower flange 148.

The pin locking system 157, carried by the tandem wheel assembly, includes a plurality of locking pins 158 provided for locking the sub-frame to the extending members. As shown in FIG. 6, the locking system 157 includes a pin spring 164 associated with each locking pin 158, disposed between vertical side wall 146 and flange 166 of locking pin 158 so as to normally bias the locking pin 158 into a retracted position, as shown in FIG. 7.

The locking system 157 includes a linkage mechanism, generally indicated at 178, carried by the sub-frame of the tandem wheel assembly. The linkage mechanism 178 comprises a shaft 180 extending longitudinally of the sub-frame (FIG. 5), generally parallel to the extending members. The shaft 180 is journalled for rotation by means of a crank arm 182 coupled to shaft 180. A linkage assembly 172 is associated with each locking pin 158. As shown in FIG. 5, each linkage assembly 172 includes a pair of spaced linkages 174 joined by a rod 176. Each linkage 174 is pivotally coupled to flange 179 extending from lip 144 at pin 181. As shown in FIG. 6, the linkages assemblies 172 are coupled for simultaneously movement via an upper link 184 and a lower link 186 in cooperation with handle return spring 194. With reference to FIGS. 5–7, linkage assembly 172 of the right-hand side of the Figures is coupled to the crank arm 182 and, as noted above, crank arm 182 is rotatably coupled to shaft 180. As in the previous embodiment, an actuating member 190 is rotatably coupled to the crank arm 182 for moving the linkage mechanism 178 from its inoperative position to its adjusting position.

The arrangement of the linkage mechanism 178 is such that rotation of crank arm 182 via manual movement of the actuating member 190 in one direction permits retraction of the locking pins 158 to a position shown in FIG. 7, and rotation of the crank arm 182 in the opposite direction permits extension of the locking pins 158 into a position shown in FIGS. 5 and 6. In the operative, extended position of the pins 158 the combined force of the handle return spring 194 is greater than the resilient bias of the pin springs 164 so that the locking pins 158 are forced to their extending position. When the pins 158 are extended, the pin springs 164 are compressed by the outward movement of an associated linkage assembly 172. As a result, the sub-frame is retained in a selected position of longitudinal adjustment with respect to the vehicle body.

To unlock and adjust the sub-frame position with respect to the vehicle body, the actuating member 190 is pulled outwardly (FIG. 7) which in turn rotates crank arm 182 so that the linkage assemblies 172 move inwardly, permitting springs 164 to bias the locking pins 158 to move to their adjusting position. If a pin 158 is stuck, a jostling motion of the vehicle may be performed in the manner described above, to free the stuck pin.

Figure 8:
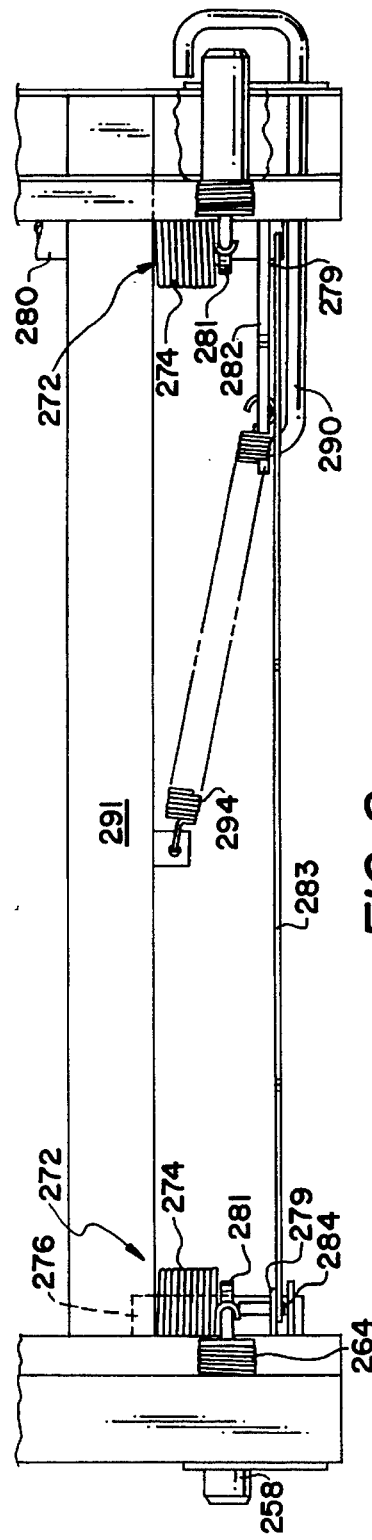
FIG. 8 is a partial plan view of a locking system of yet another embodiment of the invention.

Referring now more particularly to FIGS. 8–10, a third embodiment of the present invention is shown. FIG. 8 is a partial plan view of the locking system carried by the sub-frame of a vehicle. The locking system, generally indicated at 257, functions in a similar manner to that of the previous embodiments. Again, the extending members 14L and 14R are not shown in FIGS. 8–10 for clarity of illustration. Slide members 236L, 236R are slidable longitudinally of the trailer body on the extending members.

As shown in FIGS. 8–10, each slide member 236L, 236R has an upward inwardly directed horizontal flange 242, a lip 244 bent downwardly from the inner end of the upper horizontal flange 242, a generally vertical side wall 246, a lower inwardly directed flange 248 and a lip 250, bent upwardly from the inner end of the lower flange 248.

The pin locking system 257, carried by the tandem wheel assembly includes a plurality of locking pins 258. As shown in FIGS. 9 and 10, the locking system includes pin spring 264 associated with each locking pin 258 disposed between flange 266 of pin 258 and lip 244, so as to normally bias the locking pin 258 into a retracted position, as shown in the left side of FIG. 10.

The locking system 257 includes a linkage mechanism, generally indicated at 278, carried by the sub-frame of the tandem wheel assembly. The linkage mechanism 278 comprises a shaft 280 extending longitudinally of the sub-frame (FIG. 8) and generally parallel to the extending members. Shaft 280 is journalled for rotation by means of a crank arm 282 coupled to shaft 280. A linkage assembly 272 is associated with each locking pin 258. As shown in FIG. 8, each linkage assembly 272 includes a torsional spring 274. With reference to the right side of the Figures, the spring 274 is disposed about shaft 280. However, as shown in the left side of the Figures, the spring 274 is disposed about rod 276. Each spring 274 is coupled to a finger 281, which is coupled to rod 276 or shaft 280 by welding or the like. As shown, one finger 281 is disposed adjacent an associated locking pin 258 and the spring 274 biases the associated finger 281 and thus, the associated locking pin 258 to its extended position. Each linkage assembly 272 includes a short link 279, which is also welded to rod 276 (left side of FIGS. 8-10) or shaft 280 (right side of FIGS. 8–10). The short links 279 are coupled together by linkage 283 at pins 284.

As shown in the Figures, an actuating member 290 is coupled to the crank arm 282 for moving the fingers 281 from their operative position to their adjusting position. A handle return spring 294 is coupled between frame portion 291 and the crank arm 282.

The arrangement of the fingers 281 is such that rotation of the crank arm 282 via manual movement of actuating member 290 in one direction rotates short links 279 which in turn moves the fingers 281 inwardly, permitting retraction of the pins 258 to a position shown in the left side of FIG. 10, and rotation of the crank arm 282 in the opposite direction moves the fingers 281 outwardly permitting extension of the locking pins 258 into a position shown in FIGS. 8 and 9. In the operative, extended position of the pins 258, the combined force of the handle return spring 294 and/or the torsional springs 274 is greater than the resilient bias of the pin springs 264 so that the locking pins 258 are forced to their extending position. As shown in FIGS. 8 and 9, when the pins 258 are extended, the pin springs 264 are compressed.

When it is desired to unlock and adjust the sub-frame position with respect to the vehicle, the actuating member 290 is pulled outwardly (FIG. 10) which in turn rotates crank arm 282 so that short links 279 rotate which in turn rotates the fingers 281 inwardly permitting spring 264 to bias the locking pins 258 to move to their adjusting position. If a pin is stuck, as shown in the right-side of FIG. 10, a jostling motion of the vehicle may be preformed with the actuating member locked, as discussed above.

It can be appreciated that the slider locking system of the present invention offers many advantages over conventional devices. For example, since each locking pin is independently movable with respect to the linkage mechanism during a pin retraction operation, the manual effort to retract the pins is less than that of conventional devices which require the pins to be moved conjointly into both the retracted and extended positions thereof.

Thus, it will be appreciated that the objects of this invention have been fully and effectively accomplished. It will be realized, however, that the foregoing preferred embodiment of the present invention has been shown and described for the purposes of illustrating the structural and functional principles of the invention and is subject to change without departure from such principles. Therefore, this invention includes all the modifications encompassed within the spirit and scope of the following claims.

What is claimed is:

1. A wheeled vehicle comprising
   a trailer body including a pair of longitudinally extending members having a series of longitudinally spaced openings formed therein,
   a tandem wheel assembly including a frame supporting a portion of said trailer body for relative longitudinal sliding motion with respect thereto to vary the longitudinal position of support and a pin locking system carried by said tandem wheel assembly cooperable with said openings to selectively lock said trailer body and tandem wheel assembly in a selected longitudinal position of support, said locking system comprising:
   a plurality of pins mounted on said frame for movement between extended and retracted positions,
   said pins being constructed and arranged to engage within selected openings of said series of openings when in the extended position thereof to thereby retain said tandem wheel assembly in a selected position of longitudinal adjustment with respect to said trailer body,
   a plurality of springs, one of said plurality of springs being operatively associated with each pin for resiliently biasing said associated pin into the retracted position thereof when in an unstuck condition,
   and a linkage mechanism carried by said frame constructed and arranged to be moved between an operative position and an adjusting position,
   said linkage mechanism being constructed and arranged with respect to said pins (1) to move said pins from the retracted position thereof into the extended position thereof within a selected opening against the resilient bias thereof in response to the movement of said linkage mechanism from the adjusting position thereof to the operative position thereof and (2) to allow movement of said pins from the extended position thereof into the retracted position thereof to occur by virtue of the resilient bias thereon (A) when in an unstuck condition during the movement of said linkage mechanism from the operative position thereof and (B) when in a stuck condition at a time after the movement of said linkage mechanism from the operative position thereof to the adjusting position thereof when the stuck condition has been changed to an unstuck condition.

2. The wheeled vehicle according to claim 1, further comprising an actuating member extending generally transversely to the trailer body and being constructed and arranged to be manually grasped and pulled so as to move the linkage assembly from its operative position into its adjusting position.

3. The wheeled vehicle according to claim 2, wherein said linkage mechanism includes a shaft extending longitudinally of the frame and generally parallel to said extending members; a crank arm coupled to said shaft for rotating said shaft, said actuating member being coupled to said crank arm; and a plurality of linkages having first and second ends, each of said first ends of said linkages being coupled to said shaft, each of said second ends of said linkages including a linkage spring constructed and arranged to cooperate with an associated pin, whereby (1) when said linkage mechanism is in said operative position, each of said linkage springs biases an associated pin to the extended position thereof against the resilient bias thereof, and (2) rotation of said crank arm in one direction by manual movement of said actuating member to an adjusting position biases each of said linkage springs to an adjusting position so as to permit said pins to move from the extended position thereof into the retracted position thereof by virtue of the resilient bias thereon.

4. The wheeled vehicle according to claim 3, wherein rotation of said crank arm in a direction opposite said one direction effects movement of said pins to the extended position thereof.

5. The wheeled vehicle according to claim 3, wherein said actuating member is constructed and arranged to be locked with respect to said frame in its adjusting position thereof, whereby when certain of said pins are disposed in a stuck condition, the stuck condition can be thereafter changed to an unstuck condition upon relative movement of said sub-frame with respect to said extending members permitting said certain pins to move to said retracted position by virtue of the resilient bias thereon.

6. The wheeled vehicle according to claim 3, wherein a return spring is coupled between the frame and the crank arm.

7. The wheeled vehicle according to claim 6, wherein the combined spring force of the linkage springs and the return spring is greater than the combined spring force of the pin springs to bias said pins to their extended positions.

8. The wheeled vehicle according to claim 3, wherein said springs and said linkage springs are constructed and arranged such that as said linkage mechanism is moved to its operative position, said springs are conjointly compressed by expansion of associated linkage springs to move the pins to the extended position thereof, and when said linkage mechanism is moved to its adjusting position, said linkage springs are compressed permitting each said spring to expand so as to move an its associated pin to its retracted position thereof independently of movement of other pins to their retracted position.

9. The wheeled vehicle according to claim 2, wherein said linkage mechanism includes a shaft extending longitudinally of the frame and generally parallel to said extending members; a crank arm coupled to said shaft for rotating said shaft, said actuating member being coupled to said crank arm; a plurality of linkage assemblies operatively associated with said crank arm, each said linkage assembly being constructed and arranged to cooperate with an associated pin; and a return spring coupled between pairs of linkage assemblies, whereby (1) when said linkage mechanism is in said operative position, each of said linkage assemblies biases an associated pin to the extended position thereof against the resilient bias thereof, and (2) rotation of said crank arm in one direction by manual movement of said actuating member to an adjusting position moves each of said linkage assemblies to an adjusting position so as to permit said pins to move from the extended position thereof into the retracted position thereof by virtue of the resilient bias thereon.

10. The wheeled vehicle according to claim 9, wherein the spring force of the return spring is greater than the combined spring force of the plurality of springs so as to bias said pins to their extended positions.

11. The wheeled vehicle according to claim 2, wherein said linkage mechanism includes a shaft extending longitudinally of the frame and generally parallel to said extending members; a crank arm coupled to said shaft for rotating said shaft, said actuating member being coupled to said crank arm; a plurality of linkage assemblies operatively associated with said crank arm, each said linkage assembly being constructed and arranged to cooperate with an associated pin; and a return spring coupled between the frame and crank arm, whereby (1) when said linkage mechanism is in said operative position, each of said linkage assemblies biases an associated pin to the extended position thereof against the resilient bias thereof, and (2) rotation of said crank arm in one direction by manual movement of said actuating member to an adjusting position moves each of said linkage assemblies to an adjusting position so as to permit said pins to move from the extended position thereof into the retracted position thereof by virtue of the resilient bias thereon.

12. The wheeled vehicle according to claim 11, wherein each said linkage assembly includes a finger operatively associated with an associated pin, a torsional spring coupled to an associated finger so as to bias said finger and thus, bias an associated pin to its extended position, and linkages coupling pairs of linkage assemblies for simultaneous movement in response to movement of said crank arm.

13. The wheeled vehicle according to claim 12, wherein the combined spring force of the return spring and torsional springs is greater than the combined spring force of the pin springs so as to bias said pins to their extended positions.

* * * * *